(12) United States Patent
Vrind et al.

(10) Patent No.: US 10,939,408 B2
(45) Date of Patent: Mar. 2, 2021

(54) METHOD AND SYSTEM FOR POSITIONING LOW ALTITUDE PLATFORM STATION (LAPS) DRONE CELLS

(71) Applicant: SAMSUNG ELECTRONICS CO., LTD., Suwon-si (KR)

(72) Inventors: Tushar Vrind, Bengaluru (IN); Diwakar Sharma, Bengaluru (IN); Anshuman Nigam, Bengaluru (IN); Chandan Kumar, Bengaluru (IN); Lalit Kumar Pathak, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/788,744

(22) Filed: Feb. 12, 2020

(65) Prior Publication Data
US 2020/0260404 A1     Aug. 13, 2020

(30) Foreign Application Priority Data

Feb. 12, 2019   (IN) .............................. 201941005530
Feb. 5, 2020    (IN) .............................. 201941005530

(51) Int. Cl.
*H04W 4/00*        (2018.01)
*H04W 64/00*       (2009.01)
(Continued)

(52) U.S. Cl.
CPC ........ *H04W 64/003* (2013.01); *G08G 5/0013* (2013.01); *H04B 7/0619* (2013.01);
(Continued)

(58) Field of Classification Search
None
See application file for complete search history.

(56) References Cited

U.S. PATENT DOCUMENTS 9,622,133 B1 *    4/2017  Guvenc ................. H04W 36/20
2017/0126309 A1 * 5/2017  Rupasinghe ......... H04B 7/0617
(Continued)

OTHER PUBLICATIONS

Mastrocinque, "Open Signal Arrives, The Map That Locates the Presence of Electromagnetic Waves", 3 pages, [online at the internet: http://www.vesuviolive.it/ultime-notizie/33677-arriva-open-signal-mappa-localizza-presenza-onde-elettromagnetiche/].

(Continued)

*Primary Examiner* — Erika A Washington
(74) *Attorney, Agent, or Firm* — F. Chau & Associates, LLC

(57) ABSTRACT

Systems and methods are described for positioning a Low Altitude Platform Station (LAPS) based drone cells for supporting communication in a 3GPP network. The methods may include receiving at least one feedback parameter from a UE pertaining to a current network traffic flow and mobility with respect of the UE. The UE is selected for an aerial network through a drone base station (DBS) cell based on service requirement determined from the feedback parameter. Further, a position for at least one DBS-cell is determined with respect to the at least one selected UE based on the at least one parameter to serve the selected UE. An aerial-communication link is established between the selected UE and the DBS cell by deploying one or more LAPS as a drone base station (DBS) in accordance with the determined position of DBS-cell to thereby augment a network connectivity of the selected UE.

16 Claims, 4 Drawing Sheets

(51) Int. Cl.
| | |
|---|---|
| *H04B 7/185* | (2006.01) |
| *G08G 5/00* | (2006.01) |
| *H04W 74/00* | (2009.01) |
| *H04W 36/00* | (2009.01) |
| *H04B 7/06* | (2006.01) |

(52) U.S. Cl.
CPC .... *H04B 7/18504* (2013.01); *H04W 36/0069* (2018.08); *H04W 74/002* (2013.01)

(56) References Cited

U.S. PATENT DOCUMENTS

2017/0257779 A1* 9/2017 Zerick .................. H04W 24/02
2018/0248613 A1* 8/2018 Peitzer .................. H04B 17/12

OTHER PUBLICATIONS

Author Unknown, Technical Blog, 21 pages, [online at the internet: https://techblog.comsoc.org/category/wrc-19/].
World Radiocommunication Conference 2019 (WRC-19); 567 pages, [online at the internet: https://www.itu.int/en/ITU-R/conferences/wrc/2019/Documents/PFA-WRC19-E.pdf].
Al-Hourani, et al., "Optimal Lap Altitude for Maximum Coverage", IEEE Letters on Wireless Communications, pp. 1-4.
Mozaffari, et al., "Efficient Deployment of Multiple Unmanned Aerial Vehicles for Optimal Wireless Coverage", IEEE Communications Letters, vol. 20, Issue: 8, Aug. 2016, arXiv:1606.01962v1 [cs:IT] Jun. 6, 2016, 5 pages.
Sun, et al., "Resource Allocation for Solar Powered UAV Communication Systems", 2018 IEEE 19th International Workshop on Signal Processing Advances in Wireless Communications (SPAWC), arXiv:1801.07188v1 [cs.IT] Jan. 22, 2018, 6 pages.
Mozaffari, et al., "Mobile Unmanned Aerial Vehicles (UAVs) for Energy-Efficient Internet of Things", IEEE Transaction on Wireless Communications, vol. 16, Issue: 11, Nov. 2017, arXiv:1703.05401v2 [cs.IT] Sep. 12, 2017, 34 pages.
Mozaffari, et al., "A Tutorial on UAVs for Wireless Networks: Applications, Challenges, and Open Problems", IEEE Communications Surveys & Tutorials, vol. 21, Issue: 3, third quarter 2019, arXiv:1803.00680v2 [cs.IT] Mar. 17, 2019, 29 pages.
Muruganathan, et al., "An Overview of 3GPP Release—15 Study on Enhanced LTE Support for Connected Drones", 8 pages, [online at the internet: https://arxiv.org/ftp/arxiv/papers/1805/1805.00826.pdf].
Lin, et al., "The Sky is Not the Limit: LTE for Unmanned Aerial Vehicles", IEEE Communications Magazine, vol. 56, Issue: 4, Apr. 2018, 9 pages, [online at the internet: https://arxiv.org/ftp/arxiv/papers/1707/1707.07534.pdf].
Kakar, et al., "Delivery Time Minimization in Cache-Assisted Broadcast-Relay Wireless Networks with Imperfect CSI", arXiv:1803.04059v1 [cs.IT] Mar. 11, 2018, 4 pages.
Unknown Author, "Study on Enhanced Support for Aerial Vehicles", 3GPP TSG RAN Meeting #75, Mar. 6-9, 2017, RP-170779, 4 pages.
Chandrasekharan, et al, "Designing and Implementing Future Aerial Communication Networks", IEEE Communications Magazine, vol. 54, Issue: 5, May 2016, 10 pages.
Oubbati, et al., "Intelligent UAV-Assisted Routing Protocol for Urban VANETs", Computer Communications, Mar. 12, 2018, 57 pages.
Bor-Yaliniz, et al., "The New Frontier in RAN Heterogeneity: Multi-Tier Drone-Cells", IEEE Communications Magazine, vol. 54, Issue: 11, Nov. 2016, arXiv:1604.00381v3 [cs.NI] Jul. 22, 2016, 10 pages.
Author Unknown, Study on New Radio (NR) to Support Non Terrestrial Networks, 3GPP TR 38.811V15.0.0, (Release 15) (2018), 56 pages.
Zhou, et al., "Underlay Drone Cell for Temporary Events: Impact of Drone Height and Aerial Channel Environments", IEEE Internet of Things Journal, Special Issue on Unmanned Aerial Vehicles Over Internet of Things, vol. 6, No. 2, pp. 1704-1718, Apr. 2019, arXiv:1809.06699v2 [cs:IT] Oct. 9, 2018.
Alzenad, et al., "3D Placement on an Unmanned Aerial Vehicle Base Station for Maximum Coverage of Users with Different QOS Requirements", arXiv:1709.05235v1 [cs.IT] Sep. 15, 2017, 5 pages.
Liu, et al., "Enhanced RSTD for Scalable Bandwidth of OTDOA Positioning in 3GPP LTE", ResearchGate, Jun. 2013, 6 pages.
Antonioli, et al., "Dual Connectivity for LTE-NR Cellular Networks: Challenges and Open Issues", Journal of Communication and Information Systems, vol. 33, No. 1, 2018, pp. 282-294.
Trinh, et al., "Mobile Traffic Prediction From Raw Data Using LSTM Networks", IEEE 19th Annual International Symposium on Personal, Indoor, and Mobile Radio Communication (PIMRC 2018), Sep. 13-15, 2018, Bologna (Italy), 7 pages.
Hochreiter, et al., "Long Short-Term Memory", Neural Computation 9(8):1735 1780, 1997, pp. 1-32.
Cheng, et al., "Long Short-Term Memory-Networks for Machine Reading", arXiv:1601.06733v7 [cs.CL] Sep. 20, 2016, 11 pages.
Srivastava, et al., "Dropout: A Simple Way to Prevent Neural Networks From Overfitting", Journal of Machine Learning Research 15 (2014), pp. 1929-1958.
Kyurkchiev, et al., "Sigmoidal Functions: Some Computational and Modelling Aspects", Biomath Communications 1 (2014), pp. 1-19.
Yanikomeroglu, "Integrated Terrestrial/Non-Terrestrial 6G Networks for Ubiquitous 3D Super-Connectivity", MSWiM'18, Oct. 28-Nov. 2, 2018, Montreal, Quebec, Canada, 2 pages.
Author Unknown, "NR Physical Layer Measures", 3GPP, TS 38.215, Release 15, 2019. 18 pages.
Author Unknown"NR Physical Layer Procedures for Data" 3GPP, TS 38. 214, Release 15, 2019, 108 pages.
Sekander, et al., "Multi-Tier Drone Architecture for 5G/B5G Cellular Networks: Challenges, Trends, and Prospects", zrXiv:1711.08407v1 [cs.NI] Nov. 20, 2017, 9 pages.
Polese, et al., "Integrated Access and Backhaul in 5G MM Wave Networks: Potentials and Challenges", IEEE, arXiv:1906.01099v1 [cs.NI] Jun. 3, 2019, 7 pages.

* cited by examiner

METHOD AND SYSTEM FOR POSITIONING LOW ALTITUDE PLATFORM STATION (LAPS) DRONE CELLS

CROSS REFERENCES

This application claims priority to, and the benefit of, Indian Provisional Patent Application No. 201941005530 filed on Feb. 12, 2019 and Indian Patent Application No. 201941005530 filed on Feb. 5, 2020. The entire contents of the foregoing applications are hereby incorporated by reference for all purposes.

FIELD OF THE INVENTION

The present disclosure relates to aerial traffic channel feedback and in particular, relates to aerial-cell positioning in 3GPP networks.

BACKGROUND

Wireless communication provides a method to transfer information nearly instantly, and on demand. Activities such as navigation, entertainment, shopping, and business can be performed on a mobile device within a ground-based network. However, ground based networks have a specified range, where data transfer is possible. Therefore, there is a need in the art for a wireless communication network to provide the ability to transfer data beyond the limits of ground-based networks.

Meanwhile, Unmanned Aerial Vehicle (UAVs), or drones, can maneuver to places that people, helicopters, and planes cannot access, providing unique imaging and logistical opportunities. Additionally, drones can be deployed quickly and easily, sometimes using a mobile device such as a cell phone or computer. Embodiments of the present disclosure relate to wireless communication networks that incorporate drones, thereby providing network access to users outside the range of a ground based network.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

According to at least one embodiment, a method for positioning of a Low Altitude Platform Station (LAPS) based drone cells for supporting communication in a Third Generation Partnership Project (3GPP) network includes receiving, from a User Equipment (UE), at least one feedback parameter pertaining to a current network traffic flow and mobility of the UE; selecting the UE to use an aerial network through at least one drone base station cell based on a service requirement of the UE determined from the at least one feedback parameter; determining a position for the at least one drone base station cell with respect to the UE based on the at least one parameter; and establishing an aerial communication link between the UE and the at least one drone base station cell by deploying one or more LAPS as a drone base station in accordance with the determined position to augment a network connectivity of the selected UE.

According to at least one embodiment, a method for selecting preferred mobile stations for coverage in a 3GPP network includes receiving from one or more UEs at least one feedback parameter pertaining to at least one of: a Predicted Buffer in uplink and downlink, a Prioritized Traffic type, a Channel Quality Measurement, and a Minimum Guaranteed service based on quality of service; calculating a weighted-average for each of the one or more UEs based on the at least one feedback parameter to determine at least one of a buffer expectation and a traffic direction with respect to each of the one or more UEs; and selecting a set of UEs for using an augmented network connectivity based on at least one of: the buffer expectation being above a threshold, the traffic direction, and identifying UEs capable of being covered in a same zone of a cell.

According to at least one embodiment, a network node for selecting preferred mobile stations for coverage in a 3GPP network includes a transceiver for receiving from one or more UEs at least one feedback parameter pertaining to at least one of: a Predicted Buffer, a Prioritized Traffic type, a Channel Quality Measurement, and a Minimum Guaranteed service based on quality of service; a processor configured for: calculating a weighted average for each of the one or more UEs based on the at least one feedback parameter to determine at least one of a buffer expectation and a traffic-direction with respect to each UE; and selecting a set of UEs to use an augmented network connectivity based on at least one of: the buffer expectation being above a threshold, the traffic direction, and identifying at least one UE capable of being covered in a same zone of a cell.

According to at least one embodiment, a network node for determining an Aerial Cell Trajectory in a 3GPP network may include a transceiver for receiving at least one parameter pertaining to a current network traffic flow and mobility from a plurality of UEs, the at least one parameter including at least one of: a Predicted Buffer in uplink and downlink, a Prioritized Traffic type, a Channel Quality Measurement, and a Minimum Guaranteed service based on quality of service; and a processor configured for selecting a set of UEs from the plurality of UEs to use an augmented terrestrial network through one or more drone base station cells based at least in part on one or more service requirements of the UE determined from the at least one parameter; and determining a position for at least one drone base station cell in a 3D space with respect to the at least one selected set of UEs, the position based on one or more of: a 2D coverage zone on ground with a maximum number of UEs, a maximum weighted average of a buffer-requirement for each of the selected set of UEs, and an aerial scheduling period with respect to the at least one drone base station cell determined in real time based on a mobility and traffic pattern.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

Figure 1:
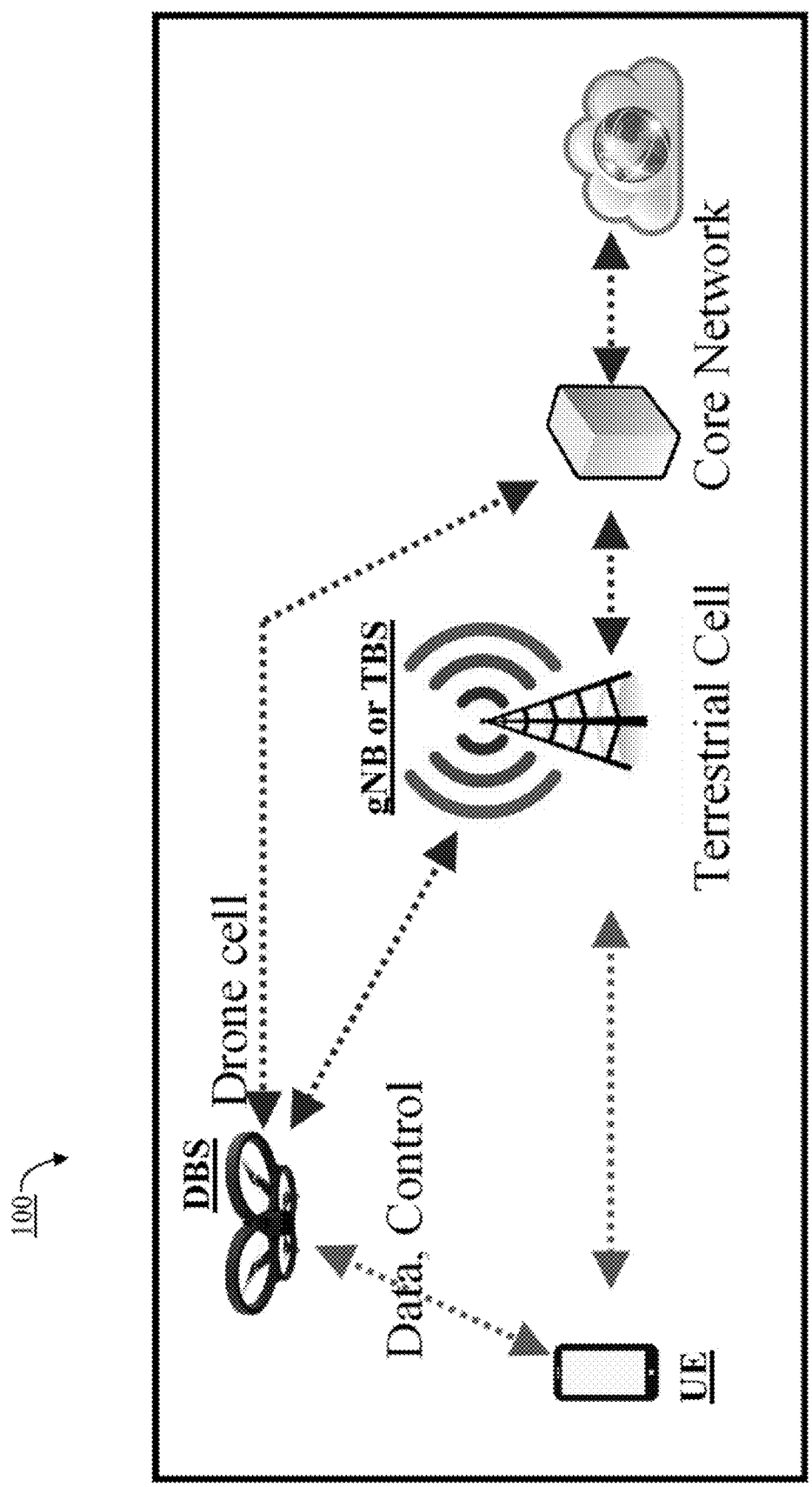
FIG. 1 illustrates a block diagram depicting a drone cell with a backhaul with a terrestrial cell, in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to increase an understanding of aspects of the present invention. Furthermore, in terms of the construction of the device, one or more components of the device may have been represented in the drawings by conventional symbols, and the drawings may show specific details that are pertinent to understanding the embodiments of the present invention so as not to obscure the drawings with details that will be readily apparent to those of ordinary skill in the art using the description herein.

DETAILED DESCRIPTION

The present disclosure relates to systems and methods of drone based wireless communication. In some embodiments, drone based cellular base station may provide users the ability to connect to a ground based network. For example, a drone may connect to a terrestrial cell tower, providing data for a user outside the range of the terrestrial cell tower.

The following issues have been observed while deploying the LAPS based drone cells. First, the positioning of the drone cell is based on the Signal to Noise and Interference Ratio (SINR) which only considers long term fading due to path loss and topology. If the traffic and mobility considerations for served UEs are not analyzed, the deployed aerial cell may not be fully utilized. Second, conventional systems for deploying LAPS based drone cells do not address UE selection. Third, the data traffic prediction models applied in the network are not applied for each UE.

Meeting standards of coverage and per user throughput may depend on proper terrestrial network planning and deployment by the operator. The user density for any location due to an event is a dynamic phenomenon and it poses a challenge for network planning, as the terrestrial cell density for a location remains static. Deploying a drone or an Unmanned Aerial Vehicle (UAV) based cell for above challenge can be an enabler for Beyond 5G (B5G) systems by providing a dynamic scalability of coverage and capacity demands. Drone based aerial communication has multiple advantages and it poses several challenges, like deployment optimization for coverage, resource allocation, interference, and energy due to altitude and flying time considerations. In the present disclosure, a Low Altitude Platform Station (LAPS) based drone cells has been provided for opportunistically augmenting the network (e.g. the terrestrial network) and address the resource allocation challenge specifically in the aerial network.

The present disclosure describes a method for positioning a Low Altitude Platform Station (LAPS) based drone cells for supporting communication in a 3GPP network. The method comprises receiving from a UE at least one feedback parameter pertaining to a current network traffic flow and mobility with respect to the UE. The UE is selected for availing an aerial network through a drone base station (DBS) cell based on service requirement of the UE determined from the feedback parameter. Further, a position for at least one DBS-cell is determined with respect to the at least one selected UE based on the at least one parameter to serve the selected UE. An aerial-communication link is established between the selected UE and the DBS cell by deploying one or more Low Altitude Platform Station as a drone base station (DBS) in accordance with the determined position of DBS-cell to thereby augment a network connectivity of the selected UE.

The state of the art literature attempts to improve the sum throughput of the aerial network, without considering the traffic distribution and user feedback. On the other hand, through the present disclosure's analyzed augmented deployment with the availability of mobility feature in drone cells, a zone based drone service model is proposed that is based on the feedback called Feedback for Aerial Cell Trajectory (FACT) from a User terminal (UE) to the network. The feedback has parameters like predicted traffic (UL/DL), traffic preference, channel quality and mobility which are used for altitude and location adjustment of a drone cell through which the aerial network: (a) selects the users to serve, (b) controls the observed channel quality by the users and (c) schedules the resources optimally for them.

The present disclosure's augmented deployment as a solution is at least suited for dynamic capacity enhancement where while the terrestrial network provides coverage and a LAPS/drone based aerial network augments and provides for uplink (UL) and downlink (DL) resource allocation in an opportunistic manner. The mobility of a drone cell gives it an opportunity to select the UEs to serve, the duration to serve them and through its change in position, control the channel quality measurement for both UL and DL for UE. The present disclosure addresses a problem of optimally positioning and dynamically repositioning of a drone cell, such that it facilitates finding the optimal set of UEs to serve, and then improve the UL and DL resource allocation, thereby maximizing per-user throughput for each served UE.

In one implementation, the Feedback for Aerial Cell Trajectory (FACT) includes: (a) Predicted Buffer Status from the UE in UL; (b) Channel Quality Measurement; (c) Predicted Buffer Status for the UE in DL; (d) Traffic preference by UE; (e) Probability of staying in the same zone for the next Aerial Scheduling Period (ASP). A zone is a region within a coverage area of the terrestrial cell, which has the UEs, which are chosen (based on FACT) by the terrestrial network, to be served by a drone cell, so that resource allocation from the drone cell is maximized in that zone for those chosen UEs. The zone can be temporally served by the aerial drone cell for one or more ASP. During the ASP, a drone is statically located at a position to serve a chosen zone, and parameters for the common channel are modified to suit that position. After the ASP, based on the new FACT, a drone cell can be moved to a new position to serve a new zone.

Through extensive simulations derived from analytical modeling, the results reveal that using the above proposed deployment and procedures in accordance with the present disclosure, the bandwidth utilization for the deployed drone cell improves in comparison to a drone cell deployment discussed in the state of the art.

Reference will now be made for the present disclosure, to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a feature, structure, or characteristic described in connection with the embodiment is included in at least one embodiment of the present invention. Therefore, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by anyone ordinarily skilled in the art to which this invention belongs. The system, methods, and examples provided herein are illustrative and not intended to be limiting.

FIG. 1 illustrates a block diagram depicting a drone cell with a backhaul with a terrestrial cell. For example, a LAPS based drone cell may be deployed when the serving terrestrial cell is unable to support a quality of service (QoS) threshold for a UE or a set of UEs, due to degraded channel environment, poor coverage or increased interference or congestion due to capacity limitation emanating from the surge in number of users in the terrestrial cell. Therefore, the present disclosure provides for dynamically increasing physical channel resources of a UE. Additionally, the present disclosure provides for a method to meet a targeted threshold QoS for a set of UEs where a drone cell deployment augments a terrestrial cell.

In an example embodiment, the Dual Connectivity (DC) or Carrier Aggregation (CA) based communication is based on frequency-carriers forming a part of a plurality of telecommunication-links defined as one or more of a first link between UE and the drone base station (DBS) cell defined by fronthaul, a second-link between UE and terrestrial cell defined by fronthaul, and a third link between the DBS cell and the terrestrial cell defined by backhaul.

The UEs, which are served by the drone cell, can be in DC or CA operation mode, where resources are allocated from both the terrestrial cell as well as the drone cell. This also alleviates the issue of interference as the carrier frequencies of the terrestrial cell and the drone cell different. The backhaul link between the drone cell and the terrestrial cell is wireless and uses either a Point to Point (P2P) dedicated link or an Integrated Access Backhaul (IAB) which shares the same carrier as the A2G link between UE and drone cell. The backhaul link is a P2P link on an independent carrier. The terrestrial cell continues to serve the UEs, which are not served by LAPS. Accordingly, the frequency-carriers forming a part of the fronthaul, backhaul, and carrier-aggregation and/or dual-connectivity based aerial communication link are either identical or different The following factors may influence the amount of inter-carrier interference that determines a position of a DBS cell: a) the fronthaul between the UE and terrestrial base station (TBS); b) the backhaul between the one or more prior-existing DBS and the TBS; c) a plurality of prior-existing DBS forming a device-to-device (D2D) cluster on air; d) one or more UEs at ground constituting a side-link; and e) any other inter-carrier interference.

For example, the aerial communication link may be further modified through removing the TBS acting as a master base station with respect to the carrier-aggregation and dual-connectivity based aerial communication link. Thereafter, the carrier-aggregation and dual-connectivity may be restricted with respect to frequency carriers configured for communication among one or more DBS and the selected UEs. In such a scenario, the plurality of DBSs comprises a first DBS and a second DBS. Moreover, in an example, the UE may also include a flying-object such as a drone that may interact with the TBS and/or the applicable DBS.

Further, each of the UE, drone, and base station may be a network node in accordance with the Third Generation Partnership Project (3GPP) standards and comprises a transceiver and processor.

Figure 3:
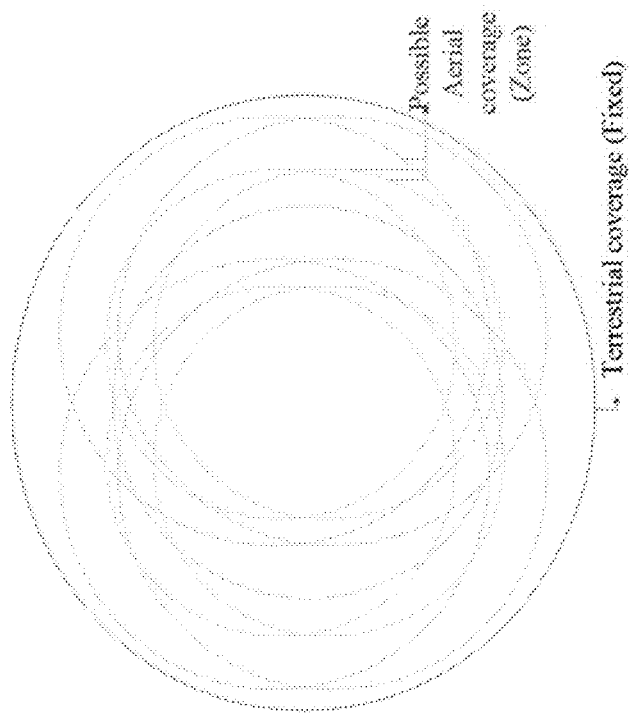
FIG. 3 illustrates territorial coverage on the ground in a 2-Dimensional plane for different drone cell positions, according to an embodiment of the present disclosure.
Figure 2:
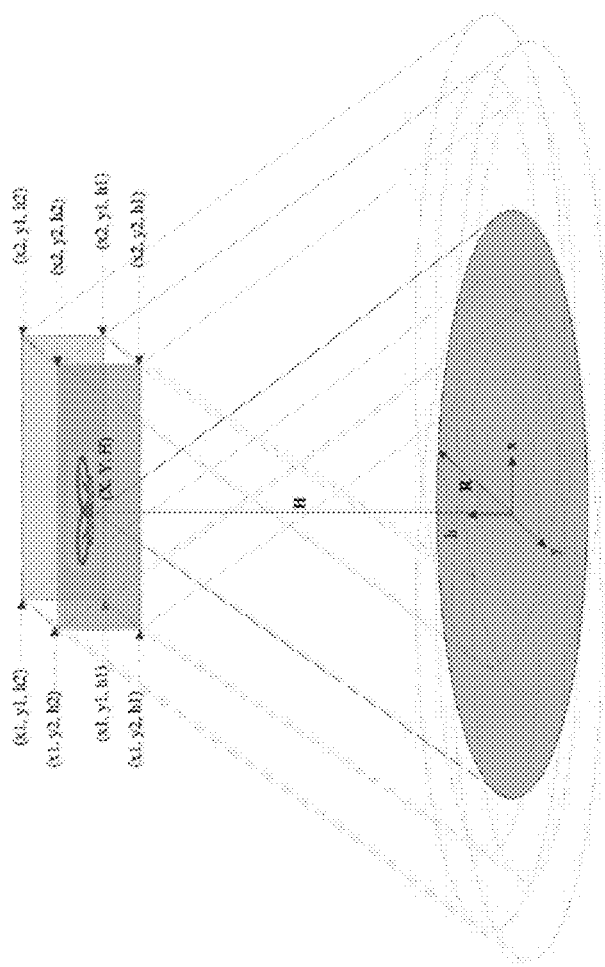
FIG. 2 illustrates the positioning of drone cells affecting a served coverage area, according to an embodiment of the present disclosure.

FIG. 2 illustrates the positioning of drone cells affecting a served coverage area, while FIG. 3 illustrates territorial coverage on the ground in a 2-dimensional (2-D) plane for different drone cell positions, according to an embodiment of the present disclosure.

As per FIG. 2, a drone cell hovers over a geographical area, and the coverage provided by the drone cell can be assumed as a 2D circular area or coverage zone at ground, as captured in FIG. 2, with radius R, dependent on the altitude of deployment. As shown, when the drone cell hovers from one position to the other, the underlying served area also moves along. The change in the territorial coverage area is shown when a drone cell moves in 3-dimensional (3D) Cartesian coordinate system, between coordinates on X-axis within the range x1 and x2, Y-axis within the range y1 and y2 and Z-axis within the range h1 and h2 is also captured in the figure.

FIG. 3 illustrates territorial coverage on the ground in a 2-Dimensional plane for different drone cell positions, according to an embodiment of the present disclosure. In FIG. 3, the coverage of both a terrestrial cell as well as an aerial cell are depicted. The 2D coverage area for a terrestrial cell is static. However, the aerial cell can may provide different 2D coverages, depending on its position in the 3D plane.

In an embodiment of the present disclosure, scheduling criteria is aware of the supported coverage at each possible drone position. For example, the UE location procedure in the coverage area of the terrestrial network uses known procedures such as Reference Sequence Time Difference (RSTD) for Observed Time Difference of Arrival (OTDOA) or other such analogous-mechanisms. Through UE feedback, the QoS information of each UE is used to predict UL and DL traffic from and to each UE and a channel quality is determined. Based on the UE feedback, a procedure is performed to select a target-set of UEs to serve, and then to move the drone cell around to be able to serve those UEs of interest efficiently. The present disclosure is based on the concept of 'zone' (shown in FIG. 3), which is a region within a coverage area of the terrestrial cell where the UEs of interest reside. In other words, coverage-zone corresponds to a terrestrial location with a substantial number of selected UEs.

Therefore, a drone is positioned in in 3D space in such a way that the 'zone' is within its coverage area. As a result, resource allocation from the drone cell is controlled to serve UEs of interest for a period called as Aerial Scheduling Period (ASP). The ASP spans several seconds, which is a design parameter for the aerial network, dependent on the tradeoff of hovering time for a drone and resource utilization of the drone cell.

The feedback from UE to the terrestrial network, i.e., Feedback for Aerial Cell Trajectory (FACT), may be a quantized information element comprising of the parameters, as in Table 1.

TABLE 1

FACT Parameters

| Parameter | Description |
| --- | --- |
| Predicted Buffer in UL | This quantity is the data packet predicted to be sent from the UE for the next ASP in the UL using a trained RNN model, at the UE, and learned based on traffic patterns at the application level. |
| Predicted Buffer in DL | This quantity is the data packet predicted to be sent from the UE for the next ASP in the DL using a trained RNN model, at the UE and learned based on traffic patterns at the application level. |
| Prioritized Traffic type | Though the QoS Class Identifier (QCI) is prioritized by design in cellular communication, this parameter describes the user preference based on the output of the RNN predictive model for a particular kind of uplink or downlink traffic. |
| Probability of staying in the same zone for next ASP | The probability that UE remains in the same location is used for a drone cell's resource utilization. The probability parameter describes the probability estimated by the UE, that the UE remains in the same location or zone. |
| Channel Quality Measurement | This pertains to the Channel Quality Index (CQI) measurement of the terrestrial cell, based on the reference signals measurements and averaging/filtering applied at the UE. |

Figure 4:
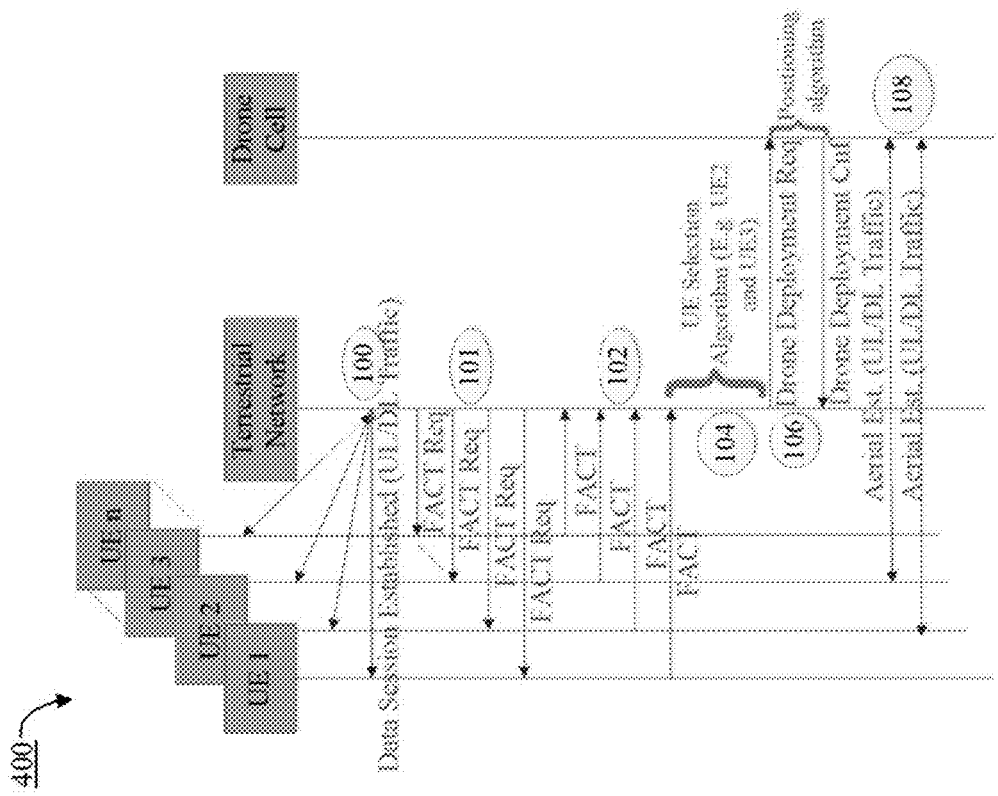
FIG. 4 illustrates a message exchange between a User Equipment (UE) and a network, according to an embodiment of the present disclosure.

FIG. 4 illustrates a message exchange between a User Equipment (UE) and a network for the FACT based Zone-based Drone Positioning and Trajectory, according to an embodiment of the present disclosure.

At step 100, a data-session is established between several UEs with the terrestrial network.

At step 101, when the terrestrial network detects that some of the UEs (or a pre-existing drone base station (DBS)) in a coverage area are not being sent quality of service (QoS) or quality of experience (QoE) qualifications, or other criteria, the terrestrial network sends a request to the UEs to share the FACT. Overall, the terrestrial network may diagnose that the UEs are experiencing capacity-limitations within the current terrestrial or aerial-cell. The UEs may be located terrestrially or aerially.

At step 102, the UEs responds back with feedback-information or FACT, which is used by the network to select the UEs, which may be served with an augmented aerial cell by either CA or DC. The feedback parameters pertain to the current network traffic flow and mobility. The feedback parameters are determined by UEs at least based on a model. For example, the feedback parameters may be determined by UEs at least based on a neural-network-based model In an example, the feedback parameters have been defined at least through earlier presented Table 1.

At step 104, the UEs are selected for an aerial network through at least one DBS-cell based on information of the UE determined from at least one parameter. For example, the selection of UEs comprise calculating a weighted average based on one or more parameter for the UE at least based on a neural-network model executed by a TBS or a pre-existing DBS. The one or more UEs are then shortlisted for the next ASP, based on at least one of a high buffer expectation, a traffic direction, and a high probability of being stationary for getting served by the DBS based cell.

At step 106, the network indicates, to the drone cells, to reposition to serve the UEs of interest. When the drone cell is in position, the drone shares a confirmation with a terrestrial network at step 106. Determining a position of a DBS cell comprises determining a location of the drone in 3D space and a 2D coverage zone of the drone at ground corresponding to the location. A duration of the ASP, with respect to the drone cell, is computed based on the mobility and traffic pattern of UEs.

In an implementation, from the selected UEs communicating with the drone during the ASP, the feedback parameter may be periodically re-received. The position of the DBS cell may be re-determined for the selected UEs and to further select other prospective UEs for a subsequent ASP. The duration of the ASP may be optionally re-computed to determine a subsequent-ASP.

At step 108, an aerial communication link is established between the selected UE and the DBS cell by deploying one or more Low Altitude Platform Station (LAPS) as a DBS in accordance with the determined position of DBS-cell to thereby augment network connectivity of the selected UE. The aerial-communication link is established between the selected UEs and the drone cell. Additionally, the data traffic is augmented through the aerial link. UE applies either CA or DC procedures to combine the UL and DL traffic as defined by 3GPP New Radio (NR) Protocol in accordance with a Medium Access Control (MAC) Protocol. The zone served by the drone cell can be changed after an ASP. During the ASP, the UEs of interest are scheduled to match a Buffer Status Report (BSR).

The terrestrial network can also predict the buffer status at UL and DL for each UE, rather than the UE reporting the buffer status at UL and DL for each UE. For example, the terrestrial network based on the UE capability, can dynamically control where the buffer status prediction happens, such as either at the network or at the UE.

For example, the coverage-zone corresponds to a terrestrial location with a substantial number of selected UEs. The location of the drone in the 3D space corresponds to the 2D coverage zone with a maximum number of selected UEs and a maximum-weighted average of buffer information for a UE.

Embodiments of the present disclosure find optimized-coordinates for positioning of a drone from amongst the set of possible positions for a set of selected UEs. The possible positions for a drone are from the set $\{L_1, L_2, \ldots L_R\}$, where each $L_i = (x_i, y_i, h_i)$, is in the 3D Cartesian coordinate system.

The theoretical sum rate for each $L_i$ is above a threshold, given by Eq. 1. For each position, the corresponding coverage zone is defined in $\{Z_1, Z_2, \ldots Z_R\}$, as shown in FIG. 2 and FIG. 3. The corresponding coverage zone may be a 2D circular area with a given radius, which increases in dimension as $L_i$ changes along the Z-axis with $(h_r > h_j)$. An example procedure (Procedure 1) may be presented to describe the modeling for each parameter in FACT, with a combination of closed-form equations and a deep learning model.

The UEs may be assumed to be uniformly distributed in the whole coverage area of the terrestrial cell, where the network knows the location of the UEs. A set of possible drone cell positions are assumed to be given to a system model where the sum rate is above a threshold (Threshold$_{sum_{TP}}$) with a constraint applied on the threshold.

$$\sum_{i=1}^{N_F} \sum_{k=1}^{K} s_k^i \log_2\left(1 + \frac{H_k^i p_k^i}{\|r - r_k\|^2}\right) \geq \text{Threshold}_{sum_{TP}} \quad (1)$$

Here $r=(x,y,h)$ describes the drone cell position and $r_k=(x_k, y_k, 0)$ describes the position of a UE. Additionally, k, $s_k^i$ defines if a subcarrier, i is allocated to a UE. Variable k, $H_k^i$ defines the channel characteristics for a UE. Variable k on a subcarrier i, and $p_k^i$ defines the power allocation on the same. The quantity $N_F$ defines the system bandwidth in the number of subcarriers, and K defines the total number of UEs. The position of the drone cell given by (x,y,h) is derived to achieve a theoretical sum rate.

Each UE maintains a data set of data traffic. The data set of data traffic may be generated from days and uses the data set of data traffic to predict the UL and DL buffer for a period spanning the next ASP. UE reports FACT parameters to the terrestrial cell. Each of the reported parameters is modeled in the subsequent subsection. The knowledge of FACT parameters is used as a weighted measure at the network to choose a position ($L_i$) for the drone cell, which serves the zone ($Z_i$), to maximize the number of UEs, the drone utilization. Thereby increasing the per-user throughput. The same is depicted in Procedure 1 as illustrated later.

Figure 5:
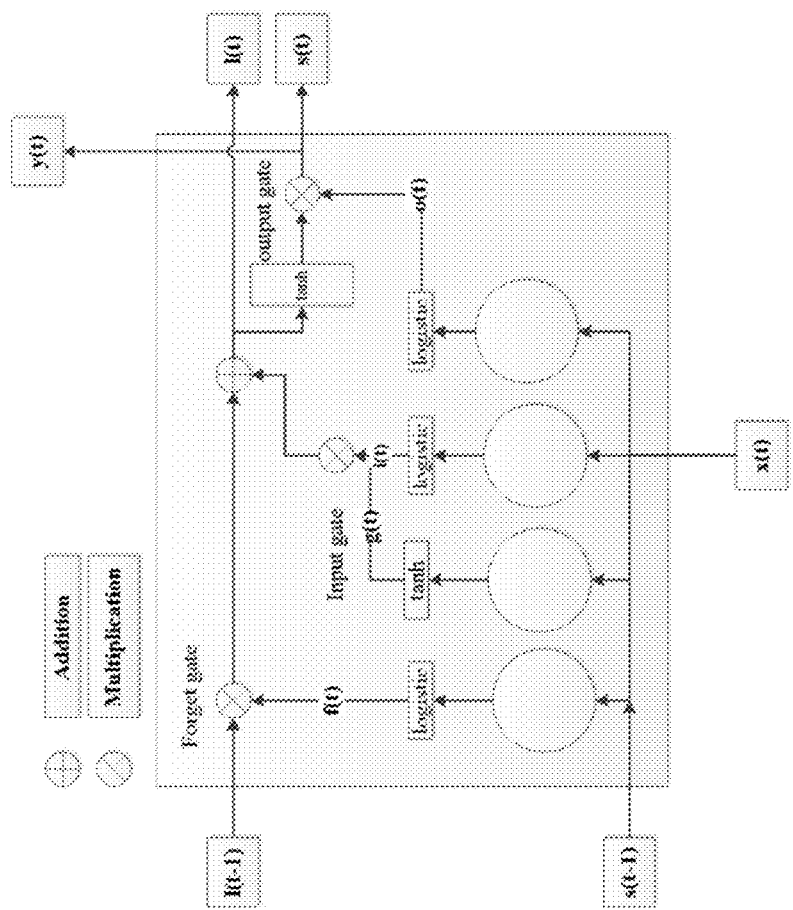
FIG. 5 illustrates a block diagram depicting a Long-Short-Term-Memory (LSTM) cell, according to an embodiment of the present disclosure.

FIG. 5 illustrates a block diagram 500 depicting a Long-Short-Term-Memory (LSTM) cell, according to an embodiment of the present disclosure.

LSTM cells manage two state vectors (i.e., short-term and long-term state vectors). For performance reasons, LSTM cells are kept separate by default. LSTM cell representation is captured in FIG. 5. FIG. 5 illustrates a block diagram depicting the LSTM cell, according to an embodiment of the present disclosure. LSTM cell looks exactly like a normal artificial neuron, except that its output is split into two vectors: s(t) as the short-term state and l(t) as the long-term state. LSTM nodes are designed such that the network over which LSTM is operating may learn what to memorize, erase, and fetch from the long-term state. As the previous time step long-term state l(t−1) traverses the network, the time step long-term state may first go through a forget gate, erasing information, then adding new information by applying addition operations on the information selected by an input gate. For a current time step, long-term state result l(t) is sent straight out of the LSTM cell without further modifications. Therefore, the design of the LSTM cell is such that at each time step, there is addition and deletion in the memory present in the long-term state. After an addition operation, the current time step long-term state is copied and passed through the hyperbolic tangent (tanh) transformer and the result is further modified by the output gate operations. This operation produces the current time step short-term state s(t). The same is the cell's output for this time step, also represented by y(t).

The internal design of an LSTM cell has a core with four, independent, fully connected layers. Each layer uses a weight matrix and biases. The current time step input vector x(t) and previous time step short-term state s(t−1) are shared as weighted transformed input to the four layers. Each layer performs differently. The first layer output f(t) may be a forget gate where, based on element-wise multiplication, the first layer output erases the information present in the long-term state. The second and third layer output g(t) and i(t) respectively work together and may be an input gate, where i(t) may decide which part of g(t) is added to the long-term state l(t). The fourth layer output o(t) may be an output gate. The fourth layer may operate on the hyperbolic tangent transformed version of the current time step long-term state by applying element-wise multiplication with o(t) to generate a current time step short-term state s(t) and cell output y(t).

An LSTM cell solves a vanishing gradient problem and memory loss in large deep neural networks. The LSTM also learns to save inputs, stores the inputs in a long-term state, learns to preserve the inputs for a period of time, and learns to extract the inputs whenever LSTM is used.

Computation for the cell's long-term state l(t), the short-term state s(t), and the output at each time step for a single instance is given below.

$$f(t) = \text{logistic}(W_{xf} \cdot x(t) + W_{sf} \cdot s(t-1) + b_f)$$

$$i(t) = \text{logistic}(W_{xi} \cdot x(t) + W_{si} \cdot s(t-1) + b_i)$$

$$o(t) = \text{logistic}(W_{xo} \cdot x(t) + W_{so} \cdot s(t-1) + b_o)$$

$$g(t) = \tanh(W_{xg} \cdot x(t) + W_{sg} \cdot s(t-1) + b_g)$$

$$l(t) = l(t-1) \otimes f(t) + g(t) \otimes i(t)$$

$$s(t) = y(t) = o(t) \otimes \tanh(c(t)) \quad (2)$$

$W_{xf}$, $W_{xi}$, $W_{xo}$, $W_{xg}$ are weight matrix which operates over current time step input sequence x(t) and $W_{sf}$, $W_{si}$, $W_{so}$, $W_{sg}$ are weight matrix which operates over previous time step short-term state s(t−1).

Figure 6:
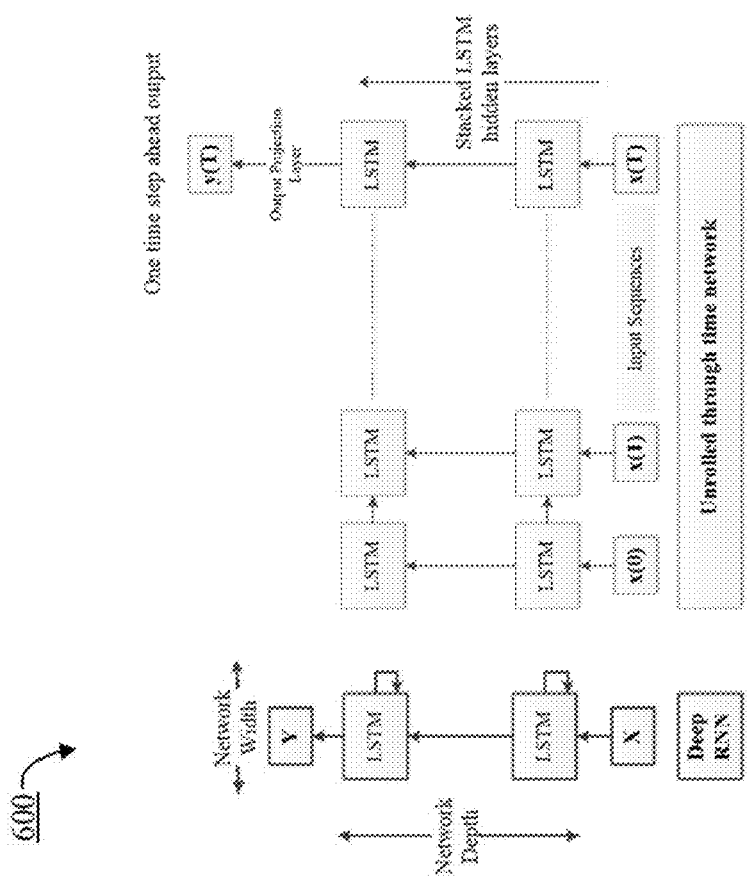
FIG. 6 illustrates an LSTM model for an Uplink/Downlink buffer prediction, according to an embodiment of the present disclosure.

FIG. 6 illustrates an LSTM model for Uplink and Downlink buffer prediction followed by positioning of the drone cells in accordance with steps 104 and 106, according to an embodiment of the present disclosure. The model for LSTM is depicted in FIG. 6.

The Uplink and Downlink buffer predictions for a next ASP may be performed using the LSTM model. For a one-step ahead ASP, the predicted Uplink and Downlink buffer for a UE is expressed in terms of trained model hypothesis $h_{LSTM}(x)$.

$$UL_{size} = \text{Predicted}(UL) = h_{LSTM}(\text{input UL buffers}) \quad (3)$$

$$DL_{size} = \text{Predicted}(DL) = h_{LSTM}(\text{input DL buffers}) \quad (4)$$

For each UE, the preference for a traffic direction is expressed using a normalized version of a sigmoid function with predicted buffers i.e. using Eq. 2 and Eq. 3 as inputs.

$$\sigma(UL) = \frac{1}{1 + e^{-\text{Predicted}(UL)}}$$

-continued $$\sigma(DL) = \frac{1}{1 + e^{-Predicted(DL)}}$$

$$Pref(UL) = \frac{\sigma(UL)}{\sigma(UL) + \sigma(DL)} \quad (5)$$

$$Pref(DL) = \frac{\sigma(DL)}{\sigma(UL) + \sigma(DL)} \quad (6)$$

Here Pref(UL) and Pref(DL) normalizes σ(UL) and σ(DL) respectively to find the preference between UL and DL information. Data buffer information can be biased towards the UL if the user is trying to upload data. Data buffer information may also be biased towards the DL if the user is trying to download. There can be a scenario when both the UL and the DL are equally used when the user is simultaneously trying to upload and download. A sigmoid activation may be used. In at least one embodiment, $Pref_{UL}+Pref_{DL}=1$. That is, the sum of Eq. 5 and Eq. 6 may be equal to 1.

For a given ASP, the probability of a UE to stay in the same geographical area is defined using Poisson's Probability model, the probability mass function (PMF) is represented below.

$$P(UE \text{ static for 'k' ASP}) = \frac{e^{-\lambda} * \lambda^k}{k!} = P_{mobility} \quad (7)$$

Here, λ is the average number of ASPs that a UE stays static, and k is the number of ASPs a UE remains static.

The channel quality measurement for the terrestrial cell may be modeled as:

$$CQI(UE) = Reported_{CQI}. \quad (8)$$

For example, channel quality measurement for a terrestrial cell may be modeled by the UE. Where $Reported_{CQI}$ is the CQI, as measured based on reference symbol power as defined in 5G NR system Further, the weighted average of the buffer information for a UE is given as:

$$FACT_{weighted} = (((UL_{size} * Pref_{UL}) + (DL_{size} * Pref_{DL})) * P_{mobility}) * \left(\frac{Max_{CQI} - Reported_{CQI}}{Scale_{CQI}}\right) \quad (9)$$

Where $Max_{CQI}$ is defined as the maximum value of the CQI, and $Scale_{CQI}$ is a scaling factor for normalization used in the model. The insight of Eq. 9 is based on the rationale that for the next ASP, a UE with high buffer expectation and a high probability of being static should be considered to be served by the drone cell if it is experiencing poor channel condition in the terrestrial cell. The $L_i$ using Procedure 1, maximizes the sum f $FACT_{weighted}$ for all $m_i$ UEs served in the coverage of the drone for the chosen ASP. The formulation of the optimization problem to find the $L_i$ is given as follows:

$$\text{maximize}(\Sigma_{j=1}^{j=m_i} FACT_{weighted_j}) \quad (10)$$

Additional constraints (C1, C2, C3) for the model may include:

$$C1: \Sigma_{j=1}^{j=m_i}(UL_{size_j}+DL_{size_j})=\text{Total System BW} \quad (11)$$

$$C2: Pref_{UL_j}+Pref_{DL_j}=1, \forall j \in m \quad (12)$$

$$C3: m_i > UE_{thesh} \quad (13)$$

Here Total System BW is defined as possible traffic, in bytes, that the terrestrial cell can serve during an ASP. Eq. 10 is solved using the expansions below. For each $L_i$, which can serve $m_i$ UEs, the weighted average of the buffer information for the Ues is given by $FACT_{weighted}[L_i]$.

$$FACT_{weighted}[L_i] = \sum_{j=1}^{j=m_i} \left(((UL_{size_j} * Pref_{UL_j}) + (DL_{size_j} * Pref_{DL_j})) * P_{mobility_j}\right) * \left(\frac{Max_{CQI_j} - Reported_{CQI_j}}{Scale_{CQI_j}}\right) \quad (14)$$

Eq. 15 is determined by substituting Eq. 3, Eq. 4, Eq. 5, Eq. 6, and Eq. 7 into Eq. 14, which denotes a weighted-average in accordance with steps 104 and 106.

$$FACT_{weighted}[L_i] = \sum_{j=1}^{j=m_i} \left(\left(h_{LSTM}(UL_j) * \left(\frac{\frac{1}{1+e^{-h_{LSTM}(UL_j)}}}{\frac{1}{1+e^{-h_{LSTM}(UL_j)}} + \frac{1}{1+e^{-h_{LSTM}(DL_j)}}}\right)\right) + \left(h_{LSTM}(DL_j) * \left(\frac{\frac{1}{1+e^{-h_{LSTM}(DL_j)}}}{\frac{1}{1+e^{-h_{LSTM}(UL_j)}} + \frac{1}{1+e^{-h_{LSTM}(DL_j)}}}\right)\right)\right) * \left(\frac{e^{-\lambda_j} * \lambda_j^{k_j}}{k_j!}\right) * \left(\frac{Max_{CQI_j} - Reported_{CQI_j}}{Scale_{CQI_j}}\right) \quad (15)$$

Identifying the maximum value of $FACT_{weighted}[L_i]$ can which serve $m_i > UE_{thesh}$, may yield the result, which is also explained in below Procedure 1.

| Procedure 1: Zone-based Drone Positioning and Trajectory Procedure |
|---|
| 1: Input: |
| 2:     L = {$L_1, L_2, \ldots . L_R$}; Drone cell locations, where $sum_{TP}$ > $Threshold_{sum_{TP}}$ |
| 3:     Z = {$Z_1, Z_2, \ldots . Z_R$}; Set of zones each corresponds to a location in L |
| 4:     U = {$UE_1, UE_2, \ldots . UE_n$}; Set of connected UEs the terrestrial cell. |
| 5:     Output: For each ASP, an $L_i$. |
| 6: Begin ASP_POSITION |
| 7:     For each UE $UE_i$ in U |

| Procedure 1: Zone-based Drone Positioning and Trajectory Procedure |
| --- |
| 8:     Get FACT parameter from each UE |
| 9:     Compute $FACT_{weighted}$ |
| 10:    End for |
| 11:    For each $L_i$ in L |
| 12:        Initialize $L_iFACT_{weighted} = 0$, $L_iNumUE = 0$ |
| 13:        For each $UE_j$ in the coverage area of $Z_i$ |
| 14:            Increment $L_iFACT_{weighted}$ by $FACT_{weighted}$ |
| 15:            if $FACT_{weighted} \neq 0$, Increment $L_iNumUE$ by 1 |
| 16:            End if |
| 17:        End for |
| 18:    End for |
| 19:    Search $L_i$ in L which has max ($L_iFACT_{weighted}$) and max($L_iNumUE$) |
| 20:    End ASP_POSITION |

In accordance with the present disclosure, drone based cells for aerial communication provide an operator a solution to dynamically scale coverage and achievable capacity, used for 6G. In accordance with the present disclosure, presented and analyzed is the augmented aerial deployment, where the terrestrial cell provides for both coverage and capacity to the served UEs, while the LAPS-based aerial cell is deployed to increase the capacity that the network can offer dynamically in a CA or DC scenario using an independent non-interfering carrier.

The present disclosure related to feedback (FACT) based positioning and trajectory of drone cells. Feedback for traffic prediction, mobility, and CQI are considered from the underserved UEs. Then, a drone position is suggested that maximizes the resource allocation for the selected UEs. For example, using the predicted data traffic along with the analytical model and system simulation, embodiment of the present disclosure have demonstrated a gain of over 44% in resource utilization, and over 27% in user throughput, compared to conventional drone cell deployment methods.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for positioning of a Low Altitude Platform Station (LAPS) based drone cells for supporting communication in a Third Generation Partnership Project (3GPP) network, the method comprising:
   receiving, from a User Equipment (UE), at least one feedback parameter pertaining to a current network traffic flow and mobility;
   selecting the UE to use an aerial network through at least one drone base station cell based on a service requirement of the UE determined from the at least one feedback parameter;
   determining a position for the at least one drone base station cell with respect to the UE based on the at least one feedback parameter; and
   establishing an aerial communication link between the UE and the at least one drone base station cell by deploying one or more LAPS as a drone base station in accordance with the determined position to augment a network connectivity of the selected UE.

2. The method of claim 1, further comprising:
   querying, by a terrestrial base-station or a pre-existing drone base station, requirements from one or more UEs based on diagnosing a deficient quality of experience, a deficient quality of service, or capacity-limitations within current terrestrial or aerial-cell;
   receiving, by the terrestrial base-station, a feedback from the one or more UEs as the at least one feedback parameter pertaining to the current network traffic flow and mobility, where the at least one feedback parameter is based at least in part on a neural-network based model and defined by one or more of:
   a Predicted Buffer in uplink;
   a Predicted Buffer in downlink;
   a Prioritized Traffic type;
   a probability of staying in a zone for a next aerial communication scheduling period with respect to a drone;
   a Channel Quality Measurement; and
   a Minimum Guaranteed quality of service.

3. The method of claim 2, wherein the selecting comprises:
   calculating a weighted-average for the UE based at least in part on a neural-network model executed by the terrestrial base-station or the pre-existing drone base station; and
   selecting the UE for a next Aerial Scheduling Period based on at least one of:
   a buffer expectation;
   a traffic direction;
   a probability of being stationary.

4. The method of claim 1, wherein the position of the at least one drone base station cell is based on:
   a location of a drone in 3D space;
   a 2D coverage zone of the drone at ground corresponding to the location;
   a duration of an Aerial Scheduling Period with respect to the at least one drone base station cell based on a mobility and traffic pattern.

5. The method of claim 4, wherein the position of the at least one drone base station cell is further based on determining an amount of inter-carrier interference from one or more of:
   a fronthaul between the UE and terrestrial base-station;
   a backhaul between one or more prior-existing drone base station and the terrestrial base-station;
   a plurality of prior-existing drone base stations forming a device-to-device cluster on air;

one or more UEs at ground constituting a side-link; and other inter-carrier interference.

6. The method of claim 4, wherein the 2D coverage zone corresponds to a terrestrial location with a substantial number of selected UEs.

7. The method of claim 4, wherein the location of the drone in 3D space corresponds to:
the 2D coverage zone with a maximum number of selected UEs; and
a maximum-weighted average of a buffer-requirement for a UE.

8. The method of claim 1, wherein the establishing of an aerial communication link comprises:
achieving an aerial communication link between the selected UE and the at least one drone base station cell;
applying, by the UE, at least one of Dual Connectivity and Carrier Aggregation procedures to combine Uplink and Downlink traffic in accordance with a Medium Access Control Protocol;
periodically re-receiving the at least one feedback parameter during an Aerial Scheduling Period;
re-determining the position of the drone base station cell for the selected UE and one or more additional UEs for a subsequent Aerial Scheduling Period; and
re-computing the Aerial Scheduling Period as a part of a determination of the subsequent Aerial Scheduling Period.

9. The method of claim 8, wherein a Dual Connectivity or Carrier Aggregation based communication is based on frequency-carriers forming a part of a plurality of telecommunication-links including one or more of:
a first link between the UE and the at least one drone base station cell defined by a fronthaul;
a second-link between the UE and terrestrial cell defined by the fronthaul;
a third link between the drone base station cell and the terrestrial cell defined by a backhaul.

10. The method of claim 9, wherein the frequency-carriers forming part of the fronthaul and the backhaul are identical.

11. The method of claim 9, wherein the frequency-carriers forming part of the fronthaul and the backhaul are different.

12. The method of claim 9, wherein the frequency-carriers forming part of the fronthaul, the backhaul, and a Dual Connectivity and Carrier Aggregation based aerial communication link are identical.

13. The method of claim 9, wherein the frequency-carriers forming part of the fronthaul, the backhaul, and a Dual Connectivity and Carrier Aggregation based aerial communication link are different.

14. The method of claim 1, further comprising modifying the aerial communication link through at least one of:
removing a terrestrial base station acting as a master base station with respect to a Dual Connectivity or Carrier Aggregation based aerial communication link; and
restricting Dual Connectivity or Carrier Aggregation with respect to frequency carriers configured for communication among one or more of a plurality of drone base stations and the selected UE, wherein the plurality of drone base stations comprise a master drone base station and a secondary drone base station.

15. A method for selecting preferred mobile stations for coverage in a 3GPP network, the method comprising:
receiving from one or more UEs at least one feedback parameter pertaining to at least one of:
a Predicted Buffer in uplink and downlink;
a Prioritized Traffic type;
a Channel Quality Measurement; and
a Minimum Guaranteed service based on quality of service;
calculating a weighted-average for each of the one or more UEs based on the at least one feedback parameter to determine at least one of a buffer expectation and a traffic direction with respect to each of the one or more UEs; and
selecting a set of UEs for using an augmented network connectivity based on at least one of:
the buffer expectation being above a threshold;
the traffic direction; and
identifying UEs capable of being covered in a same zone of a cell.

16. A method for determining an Aerial Cell Trajectory in a 3GPP network, the method comprising:
receiving at least one feedback parameter pertaining to a current network traffic flow and mobility from a plurality of UEs, the at least one feedback parameter defined by at least one of:
a Predicted Buffer in uplink;
a Predicted Buffer in downlink;
a Prioritized Traffic type;
a Channel Quality Measurement; and
a Minimum Guaranteed service based on quality of service;
selecting a set of one or more UEs from the plurality of UEs for availing an augmented terrestrial network through one or more drone base station cells at least based on one or more service requirements of the selected set of one or more UEs determined from the at least one feedback parameter; and
determining a position for at least one drone base station cell in 3D space with respect to at least one UE of the selected set of one or more UEs, the position defined by one or more of:
a 2D coverage zone on ground with a maximum number of UEs;
a maximum weighted average of a buffer-requirement for each UE of the selected set of one or more UEs;
an aerial scheduling period with respect to the at least one drone base station cell determined in real time based on a mobility and traffic pattern of the at least one UE.

* * * * *